United States Patent
Love et al.

(10) Patent No.: US 7,321,780 B2
(45) Date of Patent: Jan. 22, 2008

(54) ENHANCED UPLINK RATE SELECTION BY A COMMUNICATION DEVICE DURING SOFT HANDOFF

(75) Inventors: Robert T. Love, Barrington, IL (US); Amativa Ghosh, Buffalo Grove, IL (US); Ravi Kuchibhotla, Gurnee, IL (US); Nicholas W. Whinnett, Marlborough (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/427,361

(22) Filed: Apr. 30, 2003

(65) Prior Publication Data

US 2004/0219920 A1  Nov. 4, 2004

(51) Int. Cl.
*H04M 1/00* (2006.01)
*H04Q 7/20* (2006.01)

(52) U.S. Cl. ..................... 455/522; 455/442
(58) Field of Classification Search ........... 455/442, 455/522, 435, 436, 67.11
See application file for complete search history.

(56) References Cited

U.S. PATENT DOCUMENTS

| | | | |
|---|---|---|---|
| 5,649,291 A * | 7/1997 | Tayloe | 370/332 |
| 6,018,662 A * | 1/2000 | Periyalwar et al. | 455/442 |
| 6,449,488 B1 * | 9/2002 | Cheng et al. | 455/466 |
| 6,792,248 B1 * | 9/2004 | Naghian | 455/69 |
| 2003/0039267 A1 * | 2/2003 | Koo et al. | 370/465 |
| 2004/0162099 A1 * | 8/2004 | Chen et al. | 455/522 |
| 2004/0192308 A1 * | 9/2004 | Lee et al. | 455/436 |

OTHER PUBLICATIONS

Sampath, A. et al. "Analysis of an Access Control Mechanism for Data Traffic in an Integrated Voice/Data Wireless CDMA System." *IEEE* 1996 pp. 1448-1452.
Bao, G. et al. "CDMA2000 Rev. D. Reverse Link Proposal." QUALCOMM Feb. 2003.
Soong, A. "Ericsson's Reverse Link Enhancement for CDMA2000 1x Revision D (E-REX)" ERICSSON Jan. 2003.
Kim, Y et al. "Samsung's Reverse Link Framework Proposal for Release D." Samsung Electronics.
Fong, Mo-Han et al. "Nortel Networks Reverse Link Framework Proposal for cdma2000 Release D." Nortel Networks.
"RL Framework Proposal for Revision D." Lucent Tecchnologies.
Kim , K et al. "LGE's Reverse Link Framework Proposal." *3GPP2* LG Electronics; Dec. 2002.
Derryberry, T. et al. "CDMA2000 1xEV-DV Packet EnhAced Reverse Link (PEARL)" *3GPP2* Nokia.
"3rd Generation Partnership Project; Technical Specification Group Radio Access Network; Feasibility Study for Enhanced Uplink for UTRA (FDD)" 3GPP TR 25.896; v0.2.1; Feb. 2002.

* cited by examiner

*Primary Examiner*—George Eng
*Assistant Examiner*—Wesley Kim
(74) *Attorney, Agent, or Firm*—Randall S. Vaas

(57) ABSTRACT

A method for rate selection by a communication device for enhanced uplink during soft handoff in a wireless communication system includes a first step of receiving information from a scheduler. This information can include one or more of scheduling, a rate limit, a power margin limit, and a persistence. A next step includes determining a data rate for an enhanced uplink during soft handoff using the information. A next step includes transmitting to a serving base station on an enhanced uplink channel at the data rate determined from the determining step.

2 Claims, 5 Drawing Sheets

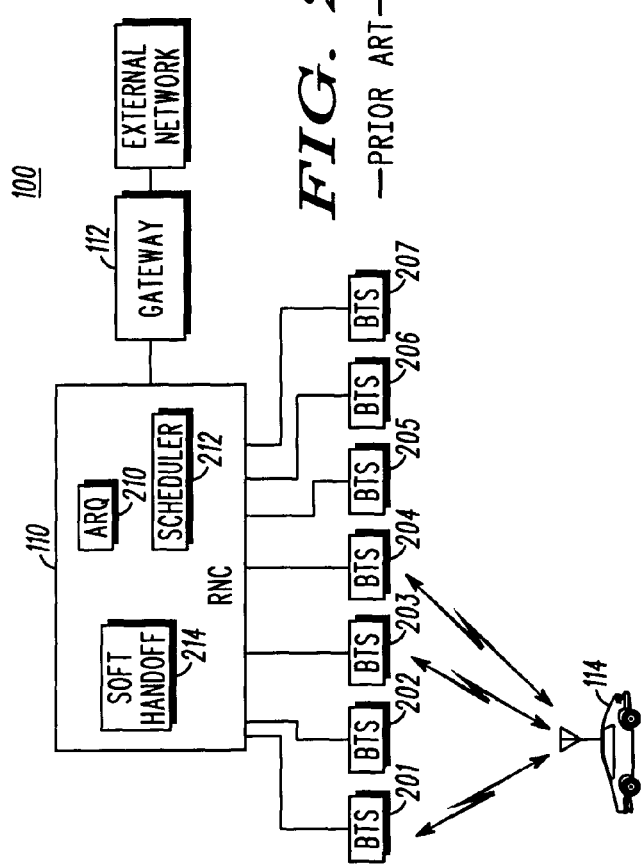
FIG. 2 —PRIOR ART—
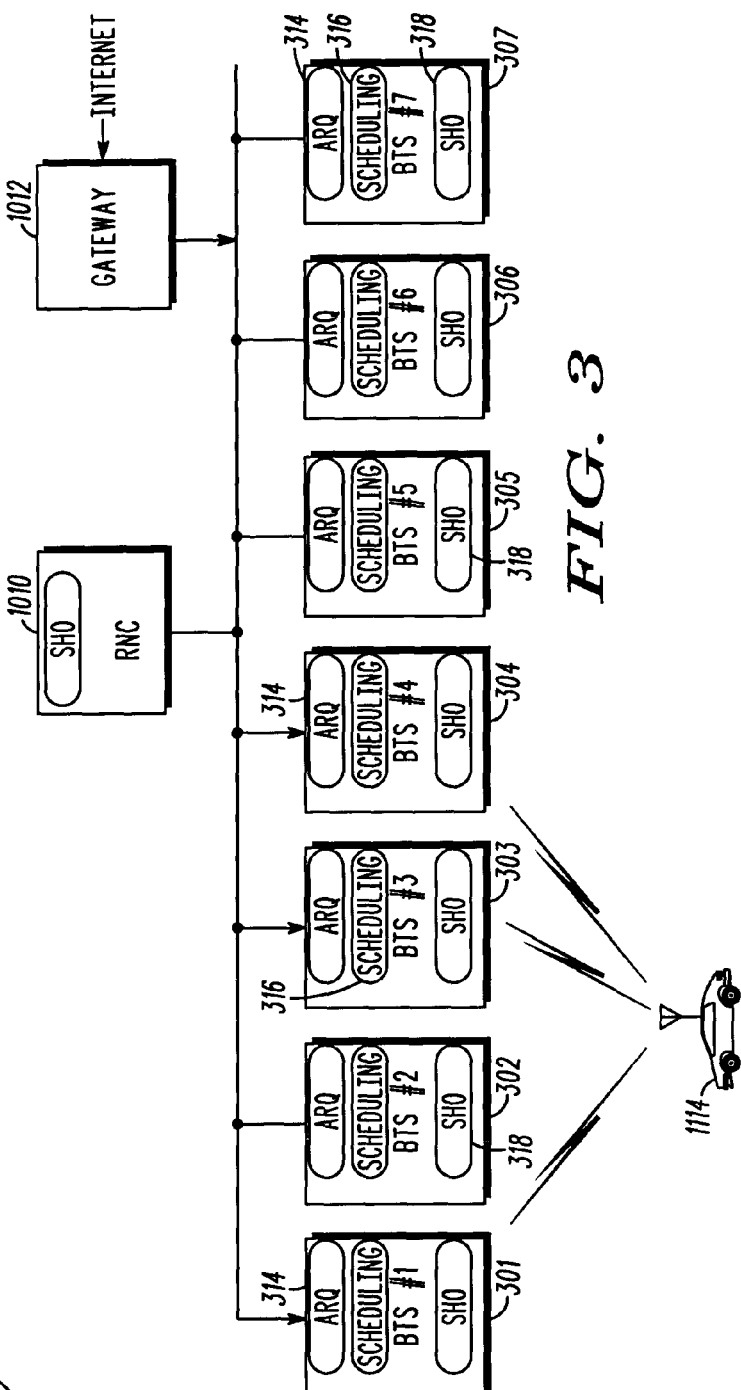
FIG. 3

FIG. 6

|  | ASSIGNED SUB-FRAME STATE COLUMN 1205 |
|---|---|
| SUBFRAME #1 | 1 |
| SUBFRAME #2 | 1 |
| SUBFRAME #3 | 0 |
| SUBFRAME #4 | 0 |
| SUBFRAME #5 | 0 |

SCHEDULING ASSIGNMENT INTERVAL 1210

FIG. 7

|  | ASSIGNED SUB-FRAME STATE COLUMN 1205 | TFRI VALUES COLUMN 1315 |
|---|---|---|
| SUBFRAME #1 | 1 | TFRI 1 |
| SUBFRAME #2 | 1 | TFRI 2 |
| SUBFRAME #3 | 0 | TFRI 3 |
| SUBFRAME #4 | 0 | TFRI 4 |
| SUBFRAME #5 | 0 | TFRI 5 |

SCHEDULING ASSIGNMENT INTERVAL 1210

ENHANCED UPLINK RATE SELECTION BY A COMMUNICATION DEVICE DURING SOFT HANDOFF

FIELD OF THE INVENTION

The present invention relates generally to a wireless communication device, and more specifically to choosing a rate for an enhanced uplink during soft handoff in a communication system.

BACKGROUND OF THE INVENTION

In a Universal Mobile Telecommunications System (UMTS), such as that proposed for the next of the third generation partnership project (3GPP) standards for the UMTS Terrestrial Radio Access Network (UTRAN), such as wideband code division multiple access (WCDMA) or cdma2000 for example, user equipment (UE) such as a mobile station (MS) communicates with any one or more of a plurality of base station subsystems (BSSs) dispersed in a geographic region. Typically, a BSS (known as Node-B in WCDMA) services a coverage area that is divided up into multiple sectors (known as cells in WCDMA). In turn, each sector is serviced by one or more of multiple base transceiver stations (BTSs) included in the BSS. The mobile station is typically a cellular communication device. Each BTS continuously transmits a downlink (pilot) signal. The MS monitors the pilots and measures the received energy of the pilot symbols.

In a cellular system, there are a number of states and channels for communications between the MS and the BSS. For example, in IS95, in the Mobile Station Control on the Traffic State, the BSS communicates with the MS over a Forward Traffic Channel in a forward link and the MS communicates with the BSS over a Reverse Traffic Channel in a reverse link. During a call, the MS must constantly monitor and maintain four sets of pilots. The four sets of pilots are collectively referred to as the Pilot Set and include an Active Set, a Candidate Set, a Neighbor Set, and a Remaining Set, where, although the terminology may differ, the same concepts generally apply to the WCDMA system.

The Active Set includes pilots associated with the Forward Traffic Channel assigned to the MS. This set is active in that the pilots and companion data symbols associated with this set are all actively combined and demodulated by the MS. The Candidate Set includes pilots that are not currently in the Active Set but have been received by the MS with sufficient strength to indicate that an associated Forward Traffic Channel could be successfully demodulated. The Neighbor Set includes pilots that are not currently in the Active Set or Candidate Set but are likely candidates for handoff. The Remaining Set includes all possible pilots in the current system on the current frequency assignment, excluding the pilots in the Neighbor Set, the Candidate Set, and the Active Set.

When the MS is serviced by a first BTS, the MS constantly searches pilot channels of neighboring BTSs for a pilot that is sufficiently stronger than a threshold value. The MS signals this event to the first, serving BTS using a Pilot Strength Measurement Message As the MS moves from a first sector serviced by a first BTS to a second sector serviced by a second BTS, the communication system promotes certain pilots from the Candidate Set to the Active Set and from the Neighbor Set to the Candidate Set. The serving BTS notifies the MS of the promotions via a Handoff Direction Message. Afterwards, for the MS to commence communication with a new BTS that has been added to the Active Set before terminating communications with an old BTS, a "soft handoff" will occur.

For the reverse link, typically each BTS in the Active Set independently demodulates and decodes each frame or packet received from the MS. It is then up to a switching center or selection distribution unit (SDU) normally located in a Base Station Site Controller (BSC), which is also known as a Radio Network Controller (RNC) in WCDMA terminology, to arbitrate between the each BTS's decoded frames. Such soft handoff operation has multiple advantages. Qualitatively, this feature improves and renders more reliable handoff between BTSs as a MS moves from one sector to the adjacent one. Quantitatively soft-handoff improves the capacity/coverage in a cellular system. However, with the increasing amount of demand for data transfer (bandwidth), problems can arise.

Several third generation standards have emerged, which attempt to accommodate the anticipated demands for increasing data rates. At least some of these standards support synchronous communications between the system elements, while at least some of the other standards support asynchronous communications. At least one example of a standard that supports synchronous communications includes cdma2000. At least one example of a standard that supports asynchronous communications includes WCDMA.

While systems supporting synchronous communications can sometimes allow for reduced search times for handover searching and improved availability and reduced time for position location calculations, systems supporting synchronous communications generally require that the base stations be time synchronized. One such common method employed for synchronizing base stations includes the use of global positioning system (GPS) receivers, which are co-located with the base stations that rely upon line of sight transmissions between the base station and one or more satellites located in orbit around the earth. However, because line of sight transmissions are not always possible for base stations that might be located within buildings or tunnels, or base stations that may be located under the ground, sometimes the time synchronization of the base stations is not always readily accommodated.

However, asynchronous transmissions are not without their own set of concerns. For example, the timing of uplink transmissions in an environment supporting MS autonomous scheduling (whereby a MS may transmit whenever the MS has data in its transmit buffer and all MSs are allowed to transmit as needed) by the individual MSs can be quite sporadic and/or random in nature. While traffic volume is low, the autonomous scheduling of uplink transmissions is less of a concern, because the likelihood of a collision (i.e. overlap) of data being simultaneously transmitted by multiple MSs is also low. Furthermore, in the event of a collision, there are spare radio resources available to accommodate the need for any retransmissions. However, as traffic volume increases, the likelihood of data collisions (overlap) also increases. The need for any retransmissions also correspondingly increases, and the availability of spare radio resources to support the increased amount of retransmissions correspondingly diminish. Consequently, the introduction of explicit scheduling (whereby a MS is directed by the network when to transmit) by a scheduling controller can be beneficial.

However even with explicit scheduling, given the disparity of start and stop times of asynchronous communications and more particularly the disparity in start and stop times relative to the start and stop times of different uplink transmission segments for each of the non-synchronized base stations, gaps and overlaps can still occur. Both gaps and overlaps represent inefficiencies in the management of radio resources (such as rise over thermal (ROT), a classic and well-known measure of reverse link traffic loading in CDMA systems), which if managed more precisely can lead to more efficient usage of the available radio resources and a reduction in the rise over thermal (ROT).

For example, FIG. 1 is a block diagram of communication system 100 of the prior art. Communication system 100 can be a cdma2000 or a WCDMA system. Communication system 100 includes multiple cells (seven shown), wherein each cell is divided into three sectors (a, b, and c). A BSS 101-107 located in each cell provides communications service to each mobile station located in that cell. Each BSS 101-107 includes multiple BTSs, which BTSs wirelessly interface with the mobile stations located in the sectors of the cell serviced by the BSS. Communication system 100 further includes a radio network controller (RNC) 110 coupled to each BSS and a gateway 112 coupled to the RNC. Gateway 112 provides an interface for communication system 100 with an external network such as a Public Switched Telephone Network (PSTN) or the Internet.

The quality of a communication link between an MS, such as MS 114, and the BSS servicing the MS, such as BSS 101, typically varies over time and movement by the MS. As a result, as the communication link between MS 114 and BSS 101 degrades, communication system 100 provides a soft handoff (SHO) procedure by which MS 114 can be handed off from a first communication link whose quality has degraded to another, higher quality communication link. For example, as depicted in FIG. 1, MS 114, which is serviced by a BTS servicing sector b of cell 1, is in a 3-way soft handoff with sector c of cell 3 and sector a of cell 4. The BTSs associated with the sectors concurrently servicing the MS, that is, the BTSs associated with sectors 1-b, 3-c, and 4-a, are known in the art as the Active Set of the MS.

Referring now to FIG. 2, a soft handoff procedure performed by communication system 100 is illustrated. FIG. 2 is a block diagram of a hierarchical structure of communication system 100. As depicted in FIG. 2, RNC 110 includes an ARQ function 210, a scheduler 212, and a soft handoff (SHO) function 214. FIG. 2 further depicts multiple BTSs 201-207, wherein each BTS provides a wireless interface between a corresponding BSS 101-107 and the MSs located in a sector serviced by the BSS.

When performing a soft handoff, each BTS 201, 203, 204 in the Active Set of the MS 114 receives a transmission from MS 114 over a reverse link of a respective communication channel 221, 223, 224. The Active Set BTSs 201, 203, and 204 are determined by SHO function 214. Upon receiving the transmission from MS 114, each Active Set BTS 201, 203, 204 demodulates and decodes the contents of a received radio frame.

At this point, each Active Set BTS 201, 203, 204 then conveys the demodulated and decoded radio frame to RNC 110, along with related frame quality information. RNC 110 receives the demodulated and decoded radio frames along with related frame quality information from each BTS 201, 203, 204 in the Active Set and selects a best frame based on frame quality information. Scheduler 212 and ARQ function 210 of RNC 110 then generate control channel information that is distributed as identical pre-formatted radio frames to each BTS 201, 203, 204 in the Active Set. The Active Set BTSs 201, 203, 204 then simulcast the pre-formatted radio frames over the forward link.

Alternatively, the BTS of the current cell where the MS is camped (BTS 202) can include its own scheduler and bypass the RNC 110 when providing scheduling information to the MS. In this way, scheduling functions are distributed by allowing a mobile station (MS) to signal control information corresponding to an enhanced reverse link transmission to Active Set base transceiver stations (BTSs) and by allowing the BTSs to perform control functions that were previously supported by a RNC. The MS in a SHO region can choose a scheduling assignment corresponding to a best Transport Format and Resource Indicator information (TFRI) out of multiple scheduling assignments that the MS receives from multiple Active Set BTS. As a result, the enhanced uplink channel can be scheduled during SHO, without any explicit communication between the BTSs. In either case, explicit transmit power constraints (which are implicit data rate constraints) are provided by a scheduler, which are used by the MS 114, along with control channel information, to determine what transmission rate to use.

As proposed for the UMTS system, a MS can use an enhanced uplink dedicated transport channel (EUDCH) to achieve an increased uplink data rate. The MS must determine the data rate to use for the enhanced uplink based on local measurements at the MS and information provided by the scheduler and must do so during soft handoff such that the interference level increase at adjacent cells (other than Active Set cells) is not so large that uplink voice and other signaling coverage is significantly reduced.

In practice, when an MS is explicitly scheduled (Explicit Mode) by the BTS, for example, to use the enhanced uplink channel, or when a MS autonomously decides when to transmit data (Autonomous mode), the MS must determine a transmission rate given the constraints of a maximum rate or equivalently a maximum power margin indicated by the scheduler and the amount of data in its buffer. This is particularly important when the MS is in a multi-coverage area served by multiple cells where, in a CDMA system, such a MS is typically in soft handoff (SHO) with any of the said multiple cells if more than one are members of the MS's current Active Set. However, the prior art does not consider the amount of interference created during soft handoff and its affect on adjacent cells.

Hence, in determining a maximum transmission rate on an EUDCH, a need exists for MS to consider the impact on all adjacent cells (typically cells in its active or neighbor set), and not just the best serving or scheduling Active Set cell, such that uplink voice and other signaling coverage is not significantly impacted. It would also be of benefit if the MS could take into account corrections due to power control commands from the BTS. It would also be an advantage to account for imbalances between transmission gains between the MS and its scheduled or target cell and non-scheduled or non-target cells.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 2 is a block diagram of a hierarchical structure of the communication system of FIG. 1;

FIG. 3 depicts a distributed network architecture in accordance with an embodiment of the present invention;

FIG. 6 is an exemplary illustration of a map included in a scheduling assignment in accordance with an embodiment of the present invention; and FIG. 7 is an exemplary illustration of a map included in a scheduling assignment in accordance with another embodiment of the present invention.

DETAILED DESCRIPTION OF THE INVENTION

Figure 1:
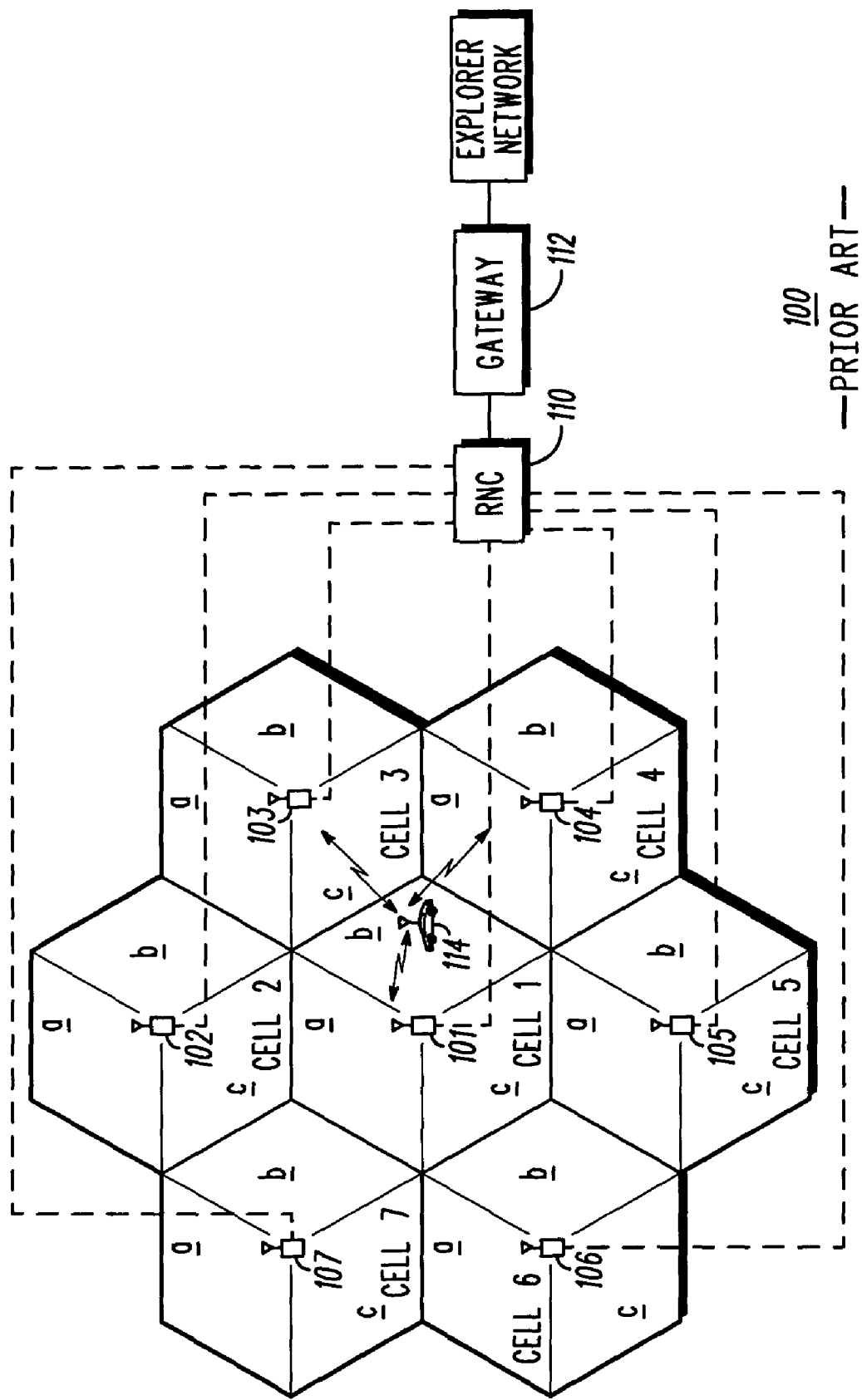
FIG. 1 is a block diagram of an exemplary communication system of the prior art.

The present invention provides for a mobile station to determine a maximum transmission rate on an enhanced uplink channel while also considering the impact on all adjacent cells (typically cells in its active or neighbor set), and not just the best serving (target cell) or scheduling Active Set cell, such that uplink voice and other signaling coverage is not significantly impacted. The present invention also takes into account corrections due to power control commands from the BTS, not only from the scheduling cell but also the Active Set of cells. Further, the present invention takes advantage of imbalances between transmission gains between the MS and its scheduled or target cell and non-scheduled or non-target cells.

The present invention supports Active Set handoff and scheduling functions by allowing a mobile station (MS) to signal control information corresponding to an enhanced reverse link transmission to Active Set BTSs and a scheduler that performs control functions. Generally, an embodiment of the present invention encompasses a method for rate selection by a communication device for uplink transmissions in a communication system. The method includes steps of receiving information from a scheduler, determining a power and/or a data rate for uplink transmissions during soft handoff using the information, and transmitting to the base station on an uplink channel at the power and/or data rate determined from the determining step.

In practice, the scheduling information received by the mobile station includes the uplink channel scheduling assignment from the scheduler, wherein the uplink channel scheduling assignment can include at least one of a sub-frame assignment, a maximum power margin target, a maximum power level target, and a maximum transport format related information. Moreover, the present invention includes preliminary steps of receiving scheduling information by a BTS from a MS, wherein the scheduling information includes at least one of a queue status and a power status of the mobile station, and determining an uplink channel scheduling assignment for the selected mobile station using at least one of the scheduling information and a base station interference metric and an uplink quality corresponding to the selected mobile station. The method further includes a step of transmitting to a serving base station on an enhanced uplink channel at the data rate determined from the determining step.

More specifically, the information in the receiving step can include one or more of a scheduling assignment, a rate limit, a power margin limit, interference rise-over-thermal limits from a plurality of Active Set base stations, a stored history of power control commands from a plurality of Active Set base stations, measured common pilot channel signal strength levels from a plurality of Active Set base stations, time constraints, and a persistence value. In addition, the determining step uses any of the above information, along with local channel conditions and buffer size to determining the maximum data rate for the enhanced uplink channel.

The present invention may be more fully described with reference to FIGS. 3-7. FIG. 5 is a block diagram of a communication system 1000 in accordance with an embodiment of the present invention. Preferably, communication system 1000 is a Code Division Multiple Access (CDMA) communication system, such as cdma2000 or Wideband CDMA (WCDMA) communication system, that includes multiple communication channels. Each communication channel comprises an orthogonal code, such as a Walsh code, that is different from and orthogonal to an orthogonal code associated with each of the other communication channels. However, those who are of ordinary skill in the art realize that communication system 1000 may operate in accordance with any one of a variety of wireless communication systems, such as a Global System for Mobile communication (GSM) communication system, a Time Division Multiple Access (TDMA) communication system, a Frequency Division Multiple Access (FDMA) communication system, or an Orthogonal Frequency Division Multiple Access (OFDM) communication system.

Similar to communication system 100, communication system 1000 includes multiple cells (seven shown). Each cell is divided into multiple sectors (three shown for each cell—sectors a, b, and c). A base station subsystem (BSS) 1001-1007 located in each cell provides communications service to each mobile station located in that cell. Each BSS 1001-1007 includes multiple base stations, also referred to herein as base transceiver stations (BTSs) or Node-Bs, which wirelessly interface with the mobile stations located in the sectors of the cell serviced by the BSS. Communication system 1000 further includes a RNC 1010 coupled to each BSS, preferably through a 3GPP TSG UTRAN Iub Interface, and a gateway 1012 coupled to the RNC. Gateway 1012 provides an interface for communication system 1000 with an external network such as a Public Switched Telephone Network (PSTN) or the Internet.

Referring now to FIGS. 3 and 5, communication system 1000 further includes at least one mobile station (MS) 1014. MS 1014 may be any type of wireless user equipment (UE), such as a cellular telephone, a portable telephone, a radiotelephone, or a wireless modem associated with data terminal equipment (DTE) such as a personal computer (PC) or a laptop computer. Note that MS, UE, and user are used interchangeably throughout the following text. MS 1014 is serviced by multiple BTSs, that are included in an Active Set associated with the MS. MS 1014 wirelessly communicates with each BTS in communication system 1000 via an air interface that includes a forward link (from the BTS to the MS) and a reverse link (from the MS to the BTS). Each forward link includes multiple forward link control channels, a paging channel, and traffic channel. Each reverse link includes multiple reverse link control channels, a paging channel, and a traffic channel. However, unlike communication system 100 of the prior art, each reverse link of communication system 1000 further includes another traffic channel, an Enhanced Uplink Dedicated Transport Channel (EUDCH), that facilitates high speed data transport by permitting a transmission of data that can be dynamically modulated and coded, and demodulated and decoded, on a sub-frame by sub-frame basis.

Communication system 1000 includes a soft handoff (SHO) procedure by which MS 1014 can be handed off from a first air interface whose quality has degraded to another, higher quality air interface. For example, as depicted in FIG. 5, MS 1014, which is serviced by a BTS servicing sector b of cell 1, is in a 3-way soft handoff with sector c of cell 3 and sector a of cell 4. The BTSs associated with the sectors concurrently servicing the MS, that is, the BTSs associated with sectors 1-b, 3-c, and 4-a, are the Active Set of the MS. In other words, MS 1014 is in soft handoff (SHO) with the BTSs 301, 303, and 304, associated with the sectors 1-b, 3-c, and 4-a servicing the MS, which BTSs are the Active Set of the MS. As used herein, the terms 'Active Set' and 'serving,' such as an Active Set BTS and a serving BTS, are interchangeable and both refer to a BTS that is in an Active Set of an associated MS. Furthermore, although FIGS. 3 and 5 depict BTSs 301, 303, and 304 as servicing only a single MS, those who are of ordinary skill in the art realize that each BTS 301-307 may concurrently schedule, and service, multiple MSs, that is, each BTS 301-307 may concurrently be a member of multiple Active Sets.

FIG. 3 depicts a network architecture 300 of communication system 1000 in accordance with an embodiment of the present invention. As depicted in FIG. 3, communication system includes multiple BTSs 301-307, wherein each BTS provides a wireless interface between a corresponding BSS 1001-1007 and the MSs located in a sector serviced by the BTS. Preferably, a scheduling function 316, an ARQ function 314 and a SHO function 318 are distributed in each of the BTSs 301-307. RNC 1010 is responsible for managing mobility by defining the members of the Active Set of each MS serviced by communication system 1000, such as MS 1014, and for coordinating multicast/multireceive groups. For each MS in communication system 1000, Internet Protocol (IP) packets are multi-cast directly to each BTS in the Active Set of the MS, that is, to BTSs 301, 303, 304 in the Active Set of MS 1014.

Preferably, each BTS 301-307 of communication system 1000 includes a SHO function 318 that performs at least a portion of the SHO functions. For example, SHO function 318 of each BTS 301, 303, 304 in the Active Set of the MS 1014 performs SHO functions such as frame selection and signaling of a new data indicator. Each BTS 301-307 can include a scheduler, or scheduling function, 316 that alternatively can reside in the RNC 110. With BTS scheduling, each Active Set BTS, such as BTSs 301, 303, and 304 with respect to MS 1014, can choose to schedule the associated MS 1014 without need for communication to other Active Set BTSs based on scheduling information signaled by the MS to the BTS and local interference and SNR information measured at the BTS. By distributing scheduling functions 306 to the BTSs 301-307, there is no need for Active Set handoffs of a EUDCH in communication system 1000. The ARQ function 314 and AMC function, which functionality also resides in RNC 110 of communication system 100, can also be distributed in BTSs 301-307 in communication system 1000. As a result, when a data block transmitted on a specific Hybrid ARQ channel has successfully been decoded by an Active Set BTS, the BTS acknowledges the successful decoding by conveying an ACK to the source MS (e.g. MS 1014) without waiting to be instructed to send the ACK by the RNC 1010.

In order to allow each Active Set BTS 301, 303, 304 to decode each EUDCH frame, MS 1014 conveys to each Active Set BTS, in association with the EUDCH frame, modulation and coding information, incremental redundancy version information, HARQ status information, and transport block size information from MS 1014, which information is collectively referred to as transport format and resource-related information (TFRI). The TFRI only defines rate and modulation coding information and H-ARQ status. The MS 1014 codes the TFRI and sends the TFRI over the same frame interval as the EUDCH.

By providing MS 1014 signaling of the TFRI corresponding to each enhanced reverse link transmission to the Active Set BTSs 301, 303, 304, the communication system 1000 can support HARQ, AMC, Active Set handoff, and scheduling functions in a distributed fashion. As described in greater detail below, the communication system 1000 allows Active Set BTSs 301, 303, 304 to provide an efficient control channel structure to support scheduling, HARQ, AMC functions for an enhanced reverse link, or uplink, channel in order to maximize throughput, and enables an MS in a SHO region to choose a scheduling assignment corresponding to the best TFRI out of multiple assignments it receives from multiple Active Set BTS.

Figure 4:
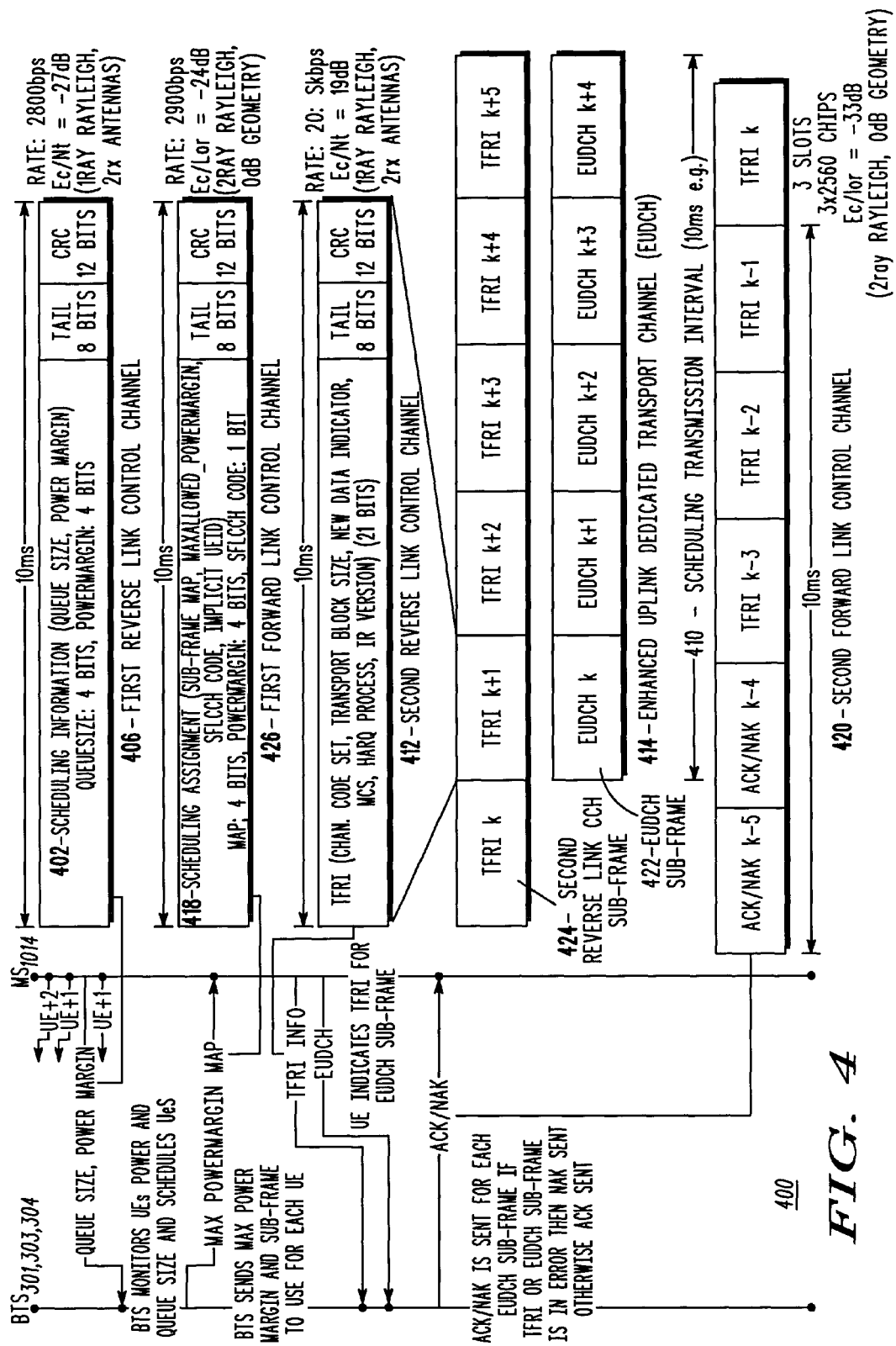
FIG. 4 is a message flow diagram with frame format information in accordance with an embodiment of the present invention.
Figure 5:
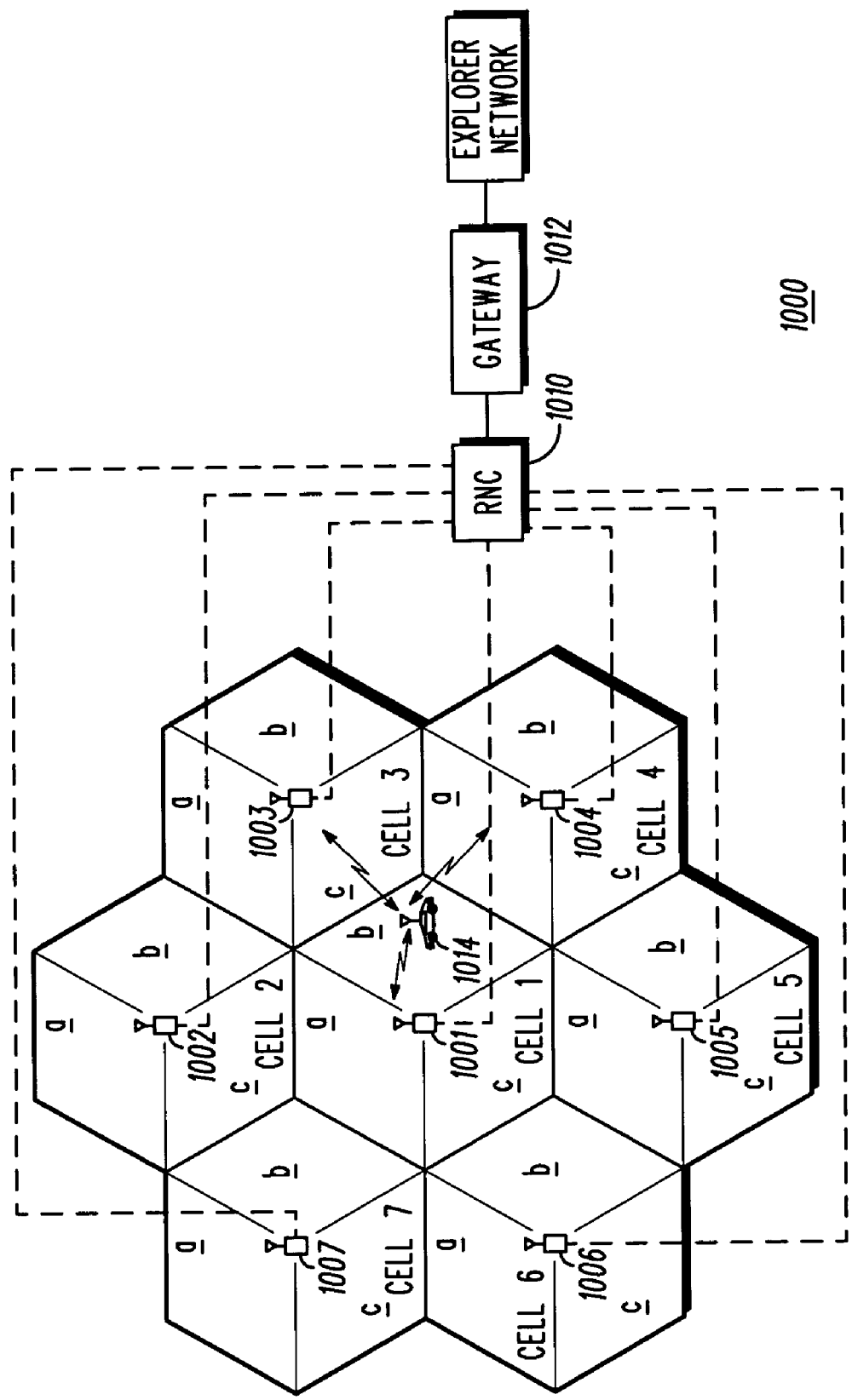
FIG. 5 is a block diagram of a communication system in accordance with an embodiment of the present invention.

Referring now to FIG. 4, a message flow diagram 400 illustrates an exchange of communications between an MS of communication system 1000, such as MS 1014, and each of the multiple BTSs included in an Active Set of the MS, that is, BTSs 301, 303, and 304. MS 1014 communicates scheduling information 402 to each Active Set BTS 301, 303, 304 using a first reverse link control channel 406 with a known fixed modulation and coding rate and transport block size. A corresponding code assignment for the first reverse link control channel is done on a semi-static basis. Preferably, MS 1014 does not transmit control information when the MS's corresponding data queue is empty.

Each Active Set BTS 301, 303, 304 receives scheduling information 402 from the MS 1014 serviced by the BTS via the first reverse link control channel 406. The scheduling information 402 may include the data queue status and the power status of the MS. Based on the scheduling information 402 received from each MS serviced by a BTS, each serving, or Active Set, BTS 301, 303, 304 schedules one or more of the MSs serviced by the BTS, that is, MS 1014, for each scheduling transmission interval 410.

Each Active Set BTS 301, 303, 304 uses reverse link interference level, MS scheduling information 402, and power control information to determine a maximum allowed power margin target or limit for each MS 1014 serviced by the BTS. Power margin may be defined as the difference between a current DPCCH power level and the maximum power level supported by the MS. Or it may be defined as the difference between a current DPCCH power level and the maximum allowed EUDCH power level. The reverse link pilot is used for demodulation purposes such as automatic frequency control, synchronization, and power control. For example, in a WCDMA system the reverse link pilot is carried on the reverse link DPCCH. Finally, power margin can also be defined as in equation (1) below.

Upon choosing an MS (e.g. MS 1014) to be scheduled, each Active Set BTS 301, 303, 304 conveys a scheduling assignment 418 to the chosen MS, such as MS 1014, on a first forward link control channel 426. The scheduling assignment 418 consists of the maximum allowed 'power margin' limit or target and a map of the allowed EUDCH sub-frame transmission intervals, such as a 2 ms sub-frame interval, for the next 10 ms transmission interval (also known as a scheduling interval) using a first forward link control channel 426. Note a map is not needed if the transmission interval is the same as the sub-frame transmission interval.

FIG. 6 illustrates an example of the map included in the scheduling assignment 418 (FIG. 4). Column 1205 comprises a set of state indicators showing which EUDCH sub-frames that MS 1014 can use during an assigned scheduling transmission interval 1210, for example scheduling transmission interval 410 of FIG. 4. In another embodiment of the present invention, the scheduling assignment 418 of FIG. 4 may further include a physical channel Walsh code assignment, also referred to herein as a second forward link control channel code (SFLCCH_code) of a second forward link control channel 420 or secondary common control physical channel (S-CCPCH) of FIG. 4. The map can also include a TFRI assignment for each EUDCH sub-frame, that is, a TFRI sub-frame corresponding to each EUDCH sub-frame. An example of such a map is shown in FIG. 7, which again includes the column of state indictors 1205 and a column of TFRI values 1315. Each Active Set BTS 301, 303, 304 also uses the second forward link control channel 420 to convey ACK/NAK information to the MS related to the MS's EUDCH sub-frame transmissions.

Each Active Set BTS 301, 303, 304 creates an MS identifier (ID) that is uniquely associated with an MS serviced by the BTS, that is MS 1014, for the first forward link control channel 426. The BTS creates the MS ID by running an n-bit ID that is uniquely associated with the MS (and known at the MS and the Active Set BTSs) through a CRC generator at the BTS. Use of the MS ID by the BTS allows the associated MS to determine when the scheduling assignment 418 sent on the first forward control channel 426 is meant for the MS. The first forward link control channel 426 can use the 10 ms frame format depicted in FIG. 4, which format includes a scheduling assignment 418, tail bits, and a CRC. Alternatively, the first forward link control channel 426 frame size may use a frame format of 2 ms. The first forward link control channel 426 is staggered to avoid additional latency.

An MS in a SHO region, such as MS 1014, may receive one or more scheduling assignments 418 from one or more Active Set, or serving, BTSs 301, 303, 304. When the MS receives more than one scheduling assignment, the MS may select a scheduling assignment 418 corresponding to the best TFRI. The MS determines the TFRI for each EUDCH sub-frame 422 based on the interference information (maximum allowed power margin limit) from the selected scheduling assignment 418 and the current scheduling information 402 measured at the MS, that is, current data queue and power status or power margin. The MS then enables a fast power control function and the feedback rate is then performed on a slot-by-slot basis, for example, 1500 Hz in the case of 3GPP UMTS. The MS then transmits the EUDCH sub-frame 422 to the Active Set BTSs 301, 303, 304 using the selected TFRI.

There are several considerations in choosing the maximum rate of data transmitted on the EUDCH. In accordance with the present invention, a MS can determine its EUDCH transmission rate using one or more of a maximum power margin limit, amount of data in the MS transmission buffer, current maximum available power margin, the power control command history received from each Active Set cell, and the current common pilot strength level from each Active Set cell. Note from this point forward cell and sector will be used interchangeably and both refer to the sector of any BSS. Any of these considerations can be used to set the maximum data rate. Therefore, the present invention chooses the minimum value of the chosen constraints to set the maximum data rate.

The maximum power margin limit ($P_{margin\_limit}$) is sent by the scheduler (or UTRAN) to the MS. The power margin is as defined in equation (1) below. The power margin is the available MS power after accounting for the power requirements of control channels (DPCCH, HS-DPCCH) and other higher priority channels such as a DPDCH which may serve as a reference bearer. The maximum power margin limit can be sent in scheduling assignment information, such as being sent in a scheduling assignment message (SAM) from the scheduling BTS or sent on the S-CCPCH. For explicit scheduling one or more BTS can schedule one or more MSs to transmit on a given time interval by sending a SAM on a dedicated channel or a common code channel. For autonomous scheduling a power margin limit and persistence is sent either via dedicated channels or broadcast using S-CCPCH. $P_{margin\_limit}$ is based on scheduling information, which can include buffer occupancy (BO) and current power margin, provided by MS to the Active Set BTSs as scheduling information (SI). For explicit scheduling the BTS (given the SI from all the MSs it serves and the local information such as interference rise over thermal noise (RoT)) decides when and which mobiles will transmit. For autonomous scheduling the mobile decides when to transmit on the enhanced uplink channel using persistence and power margin limit information provided by the Active Set BTSs. Preferably, the MS is additionally constrained to specific time periods (sub-frames) along with other mobiles in the autonomous scheduling mode. The MS initiates the move to autonomous mode from explicit mode and there is handshaking involved between the MS and the BTS during the mode transitions. $P_{margin\_limit}$ can also be based on loading information, such as RoT measurements and other local information such as received pilot SNR (DPCCH)) at the scheduling BTS.

The current maximum available power margin ($P_{margin}$) is defined as $$P_{margin} = P_{eudch} = P_{max} - P_{dpcch}(1 + \beta_{dpdch} + \beta_{hs-dpcch}) \quad (1)$$

where $\beta_{hs-dpcch}$ is the power ratio of HS-DPCCH/DPCCH. The high speed dedicated physical control channel (HS-DPCCH) is a physical channel introduced for HSDPA in 3GPP release 5. It carries the C/I feedback information (CQI) and ACK/NAK information to support H-ARQ and fast scheduling and rate assignment), and $\beta_{dpdch}$=DPDCH/DPCCH power ratio.

In a preferred embodiment, the present invention accounts for adjacent cell interference during SHO. In particular the MS can use the power control command history received from each Active Set cell, including the scheduling cell, and/or the current common pilot strength level from each Active Set cell.

Given the information above, along with the amount of data in the transmit buffer of the MS, there are five main steps to computing the maximum allowed UE rate ($R_{max\_allowed\_UE}$) in accordance with the present invention, which is eventually signaled to the Active Set BTSs on the enhanced uplink control channel E-DPCCH (e.g. TFRI) where its transmission start time can proceed the EUDCH transmission start time.

In a first step, the maximum achievable rate ($R_{max\_achievable}$) is computed by the following equation:

$$R_{max\_achievable} = K1 * P_{margin}/P_{dpdch} = K1 * \beta_{eudch} \quad (2)$$

where the scale factor (K1) is determined by:

$$K1 = R_{reference\_bearer} * \Delta_{Eb/Nt}/\beta_{reference\_bearer}$$

where $R_{reference\_bearer}$ is the reference bearer rate, and $\beta_{preference\_bearer}$ is the reference bearer power to DPCCH power ratio of the reference bearer whose frame erasures are used to drive the outer loop (e.g. the reference bearer could be a 7.95 Kbps speech service). The reference bearer is a physical channel with known rate and a CRC (or a other hard or soft pass/fail decoding check herein referred to as frame quality information) that drives outer loop power control. Outer loop power control controls an inner loop setpoint (also known as an outer loop threshold) based on frame quality information. The inner loop setpoint is used to set the power control commands used for fast (inner loop) power control). $\Delta_{Eb/Nt}$ is the Eb/Nt difference in dB between the enhanced uplink channel for a particular rate and frame error rate (FER) target level and the reference bearer channel and its FER target level.

Alternatively, one could use null frames, which is when a CRC is rate matched over a 10 or 20 ms DPDCH TTI (voice or data frame). This would change the value of the terms determining K1 (i.e. $\Delta_{Eb/Nt}$, $R_{reference\_bearer}$, and $\beta_{reference\_bearer}$). Finally, it is possible to just fix the inner-loop setpoint to map the pilot (DPCCH) Ec/Nt to a fixed level (−28 dB e.g.), which must be communicated to MS at call setup. This option of fixing the inner loop setpoint would be used if there were no other service (such as speech) and one decided not to use the null frame approach.

Eb/Nt requirement difference (based on performance requirements for channels given in the specification and refined by testing) is determined between reference bearer and the EUDCH given their corresponding FER targets. For each FER target desired for the enhanced uplink channel (EUDCH) a corresponding Eb/Nt is determined. This is compared to the Eb/Nt requirement for the reference bearer channel's FER target level (which typically will be around 2%). Hence, $\Delta_{Eb/Nt}$ is the Eb/Nt difference in dB between the enhanced uplink channel for a particular rate and FER target level and the reference bearer channel and its FER target level. Typically, a Eb/Nt delta table is created since there maybe multiple FER targets for a given enhanced uplink rate as well as multiple rates.

Afterwards, the required EUDCH to pilot power ratio, $\beta_{eudch}$, is determined for the EUDCH selected rate ($R_{max\_achievable}$). The EUDCH to pilot power ratio is a function of the EUDCH rate. Typically, the ratio is about 4 dB for a 10 kbps rate and increases by 10log10 (Reudch/10 kbps) as $R_{eudch}$ exceeds 10 kbps. The relationship can be refined based on link testing and measurements. Tables with these power ratios exist in the 3GPP2 specifications for convolutional and turbo encoded channels for different rates and different FER targets. Determining $\beta_{eudch}$ implies that an iterative solution is required for K1 since $\Delta_{Eb/Nt}$ is a function of $R_{max\_achievable}$. That is, an iterative solution is implied since the maximum achievable rate for the EUDCH ($R_{max\_achievable}$) is an unknown to solve for, and $\beta_{eudch}$ is an unknown on the right side of the equation dependent on it. Alternatively, it might be possible to eliminate this by solving for $R_{max\_achievable}/\beta_{eudch}$. As an example the resulting equation can be computed as:

$$R_{max\_achievable} = (\beta_{eudch}/\beta_{reference\_bearer}) * R_{reference\_bearer} * \Delta_{Eb/Nt} = K1 * \beta_{eudch} \quad (3)$$

where $K1 = R_{reference\_bearer} * \Delta_{Eb/Nt}/\beta_{reference\_bearer}$

In a second step, the rate necessary to exhaust the buffer ($R_{exhaust}$) for the scheduled (explicit mode) or desired (autonomous mode) transmission interval is computed, as is known in the art, as.

$$R_{exhaust} = \text{Buffer size in bits/Scheduling transmission interval} \quad (4)$$

For example, if there where 2000 bytes in the buffer and the transmission interval was 10 ms then the $R_{exhaust} = 2000*8/0.01 = 1.6$ Mbps.

In a third step, the maximum power margin limit ($P_{margin\_limit}$) is updated to account for changes in the scheduling (explicit mode) or targeted (autonomous mode) serving cell's reverse link rise over thermal (RoT) so that the maximum allowed rate for the scheduling cell ($R_{max\_allowed}$) can be computed. The scheduling cell sends an explicit scheduling assignment to the MS for when to transmit so it may be the only cell guaranteed to be listening for the MS's transmission. The target cell, in the case of autonomous mode, is the one the MS thinks is the best serving cell based on pilot measurements and power control command history. This update or correction to $P_{margin\_limit}$ is called TPC correction, in accordance with the present invention. To compute the correction the power control commands of the scheduled or targeted serving cells (depending on scheduling mode) can be integrated from a time corresponding to when the scheduling assignment message (SAM) was transmitted by the UTRAN to a present time in order to adjust the $P_{margin\_limit}$. Since the MS is power controlled its current power margin moves closer or farther away from this limit as each new power control command is received.

Note that without any TPC corrections the maximum allowed rate indicated by the UTRAN would be calculated as:

$$R_{max\_allowed} = K2 * P_{margin\_limit}/P_{dpcch} = K2 * \beta_{margin\_limit}$$

However, the present invention accounts for corrections due to TPC commands and pilot Ec/Nt measurements from each Active Set serving cell (including a scheduling or targeted cell (ST) and non-scheduling or non-targeted cell (NSNT)) by applying a TPC correction to $R_{max\_allowed}$ as follows:

$$R_{max\_allowed} = K2 * \beta_{margin\_limit} * TPC\_correction * TPC\_correction2(Ec/Nt_{ST}, Ec/Nt_{NSNT})$$

where

TPC_correction2 = alpha, where $0 < \text{alpha} < 1$ for case A (below), or $= 1$, otherwise and TPC_correction = 1, if case B (below) occurs, or $= f(SUM(\text{scheduling BTS TPC commands over a previous time period}))$, otherwise where $$\text{alpha} = \frac{\gamma N_{PC}(\text{start\_i, end\_i})}{N_{PC}(\text{start\_i, end\_i}) + \text{MAX}\left(\sum_{i=\text{start\_i}}^{\text{end\_i}} PC_{ST\_CELL,i}, 0\right) - \text{MIN}\left(\sum_{i=\text{start\_i}}^{\text{end\_i}} PC_{NSNT\_CELL,i}, 0\right)}$$

where
$N_{PC}(\text{start\_i,end\_i})$—number PC commands received from slot start_i to slot end_i PC_ST_cell,i—PC commands from ST cell for slot i
PC_NSNT_cell,i—PC commands from a NSNT cell for slot I
Gamma is a scale factor (e.g. 0.5)

In an alternative embodiment, $$\text{alpha} = \frac{\gamma}{1 + \text{MAX}\left(\sum_{i=\text{start\_i}}^{\text{end\_i}} PC_{\text{ST\_CELL},i}, 0\right) - \text{MIN}\left(\sum_{i=\text{start\_i}}^{\text{end\_i}} PC_{\text{NSNT\_CELL},i}, 0\right)}$$

Note that the power control (PC) commands used here are interpreted as +/−1.0 or +/−0.5. An example of function, f(.), is given by $$f(SUM(.)) = \frac{\beta 10^{-SUM(.)/10}}{\lambda}$$

where $\beta$ and $\lambda$ are scale factors. For example, $\beta=0.5$ and $\lambda=1.0$.

The summing operation occurs over a previous time period defined as the time the SAM was transmitted to the time it is received at the MS or alternatively from the time the power margin limit was actually computed at the BTS to the time it is received at the MS or in another alternative embodiment the summing operation occurs from the time the power margin was actually computed at the BTS to the time just prior to when the MS make its rate decision.

In Case A, a scheduling or target serving cell's power control command history indicates an increase in RoT. For example, consecutive power control up-commands are received from the scheduling or target serving cell or alternatively the power control commands are integrated over the previous time period and result in a significant increase in the inner loop power adjustment or alternatively the current power gain level of the DPCCH (which accounts for both inner loop power adjustment and the current open loop power adjustment)shows a significant net increase over the previous time period while the other non-scheduling or non-target serving cell's power control command history indicates a reduction in RoT over the same previous time period. Since the power control bits from the weaker non-scheduling BTS cells are likely unreliable the TPC_Correction2 is only used in the limited imbalance cases (e.g. less than 4 dB imbalance). It is important to note that the TPC bits could all indicate power up from a weak leg, which typically occurs with link imbalance of 4 dB or more. Using information in this latter imbalance case would produce erroneous results. Note that when the MS is not in soft handoff TPC_Correction2=1.0.

In Case B, a pilot from strongest cell site is more than a predetermined amount (e.g. 3 dB) higher than the scheduling site.

Alternatively, given an average (over 30 slots, for example where a slot is 0.67 ms) of common downlink pilot Ec/Nt of the scheduling or target site, and the other serving Active Set cells, then the following rules can be used to compute $R_{max\_allowed}$:

If ($Ec/Nt_{ST} < Ec/Nt_{NSNT}+4$ dB )

$$R_{max\_allowed}=K2*\beta_{margin\_limit}*TPC\_correction*TPC\_correction2 \quad (6)$$

Else if ($Ec/Nt_{ST} < Ec/Nt_{NSNT}+1$ dB)

$$R_{max\_allowed}=K2*\beta_{margin\_limit}*TPC\_correction*(TPC\_correction2)^2 \quad (7)$$

Else $$R_{max\_allowed}=K2*\beta_{margin\_limit}*TPC\_correction \quad (8)$$

where the previous rules for K2, TPC_correction, and TPC_correction2 apply.

In a fourth step, a maximum allowed SHO rate ($R_{max\_sho}$) is computed which keeps the interference at a level that keeps acceptable voice and signaling coverage at adjacent cells when the SHO MS transmits on the E-DCH. Since all users are power controlled to arrive at the minimum power required to achieve a targeted FER, and typically the rate of each user is known, then it is possible to compute what the rise will be if another user at a specific rate with some required FER target level is added. The interference assessment is assisted by RoT measurements taken periodically by each BTS. In the case described here, a BTS does not know if a user controlled by an adjacent cell will transmit and at what rate. However, with the control scheme of the present invention, a BTS only needs minimum margin (e.g. effectively one or two voice users) to account for users scheduled by adjacent BTSs. That is, it is desired that the interference contribution to adjacent cells by the SHO MS be effectively only one or two 12.2 kbps users when not DTX'ed. For example, speech users do not always transmit at 12.2 kbps (or at other rates associated with the chosen AMR vocoder rate). When there is no perceptible speech, transmission ceases (DTX) or transmissions continue where only a CRC rate match across the entire frame interval (TTI) is sent which allows outer loop power control to continue operation. Also SID (silence indicator descriptor) frames are periodically sent during DTX mode. Hence, equation (9), shown below, starts at the maximum effective rate ($R_{max\_effective\_SHOtarget}$), which effects the amount of overhead the scheduler BTS needs to account for in determining the maximum power margin limit ($P_{margin\_limit}$), and allows an increase in the maximum effective rate the larger the link imbalance gets.

$$R_{max\_sho}=R_{max\_effective\_SHOtarget}*g(\text{imbalance}) \quad (9)$$

(e.g. $R_{max\_effective\_SHOtarget}=12.2$ kbps) where imbalance=scheduling cell's link transmission (linear) gain (or path loss between BTS and MS including antenna gains) between it and MS divided by the adjacent cell transmission gain (between it and MS) with next largest or largest transmission gain relative to scheduling cell's link transmission gain and can be estimated by:

Imbalance=Pilot $Ec/Nt_{ST}$/MAX(Pilot $Ec/Nt_{NSNT1}$, Pilot $EC/Nt_{NSNT2}$, . . .)

Where Pilot $Ec/Nt_{NSNTi}$ is the pilot Ec/Nt of non-serving or non-target cell i.

The function, g(.), can be a direct mapping, e.g. g(imbalance)=1*imbalance, or it can be more complicated where the go causes the imbalance to be limited and/or scaled.

$R_{max\_effective\_SHOtarget}$ can be chosen based on current loading of the scheduling BTS, assuming that adjacent cells are similarly loaded, or it can be fixed to a relatively low data rate corresponding to one or two speech users. The MS knows the loading on the scheduling cell from the power margin limit sent in the SAM (or via S-CPCCH for autonomous scheduling) which indicates changes in loading can be accounted for as discussed above with power control information. The power margin limit computed by a BTS can be set to account for adjacent cell RoT loading. If adjacent cells are not heavily loaded this will show up indirectly in the RoT thermal measurements of the cell in question. Also, periodically the RNC (CBSC) will send down information for computing the power margin limit or an adjustment for the power margin limit for each cell based on the RoT thermal measurements that are periodically sent from each BTS to the RNC and/or based on the number of active users in the adjacent cells. The $R_{max\_effective\_SHOtarget}$ is a system parameter that can be set conservatively (e.g. one or two speech users) especially if there is no RNC feedback (i.e. information passed down to help set the power margin limit) or more aggressively especially with RNC feedback. The average of the aggregate number of HARQ retransmission for users scheduled by a given BTS can also be used to dynamically adjust $R_{max\_effective\_SHOtarget}$.

Finally, in the fifth step, the allowed uplink rate or maximum allowed uplink rate ($R_{max\_allowed\_MS}$) is $$R_{max\_allowed\_MS} = \text{MIN}(R_{max\_allowed}, R_{max\_achievable}, R_{exhaust}, R_{max\_sho}) \quad (10)$$

This provides a more useful determination of the allowable or maximum allowable enhanced uplink rate during soft handoff than is available in the prior art.

In another embodiment the final step in determining the allowed uplink rate or maximum allowed uplink is $$R_{max\_allowed\_MS} = \text{MIN}(R_{max\_allowed}, R_{max\_achievable}, R_{exhaust}) \quad (11)$$

This would be more useful determination of the allowable or maximum allowable enhanced uplink rate when the user is not in soft handoff.

In another embodiment of the present invention, a persistence parameter (p) is defined and broadcast over the cell, for additional use in controlling data rates, as well as power, in autonomous mode. In autonomous scheduling all MSs are allowed to transmit simultaneously, but their data rates and powers are controlled by the BTS. In the prior art, the maximum data rate, or equivalently referred to as the $T/P_{max\_auto}$, is updated by the BTS every frame or sub-frame and the information is conveyed to the individual MS using a dedicated downlink control channel. In particular, this can be done by restrictions in the Transport Format Combination (TFC) Set imposed by the BTS. One way to convey the information is to puncture some bits in the downlink DCH. This however, will degrade the performance of existing channels and power offset for these un-coded bits should be set at a considerably higher value in some cases (e.g. soft handoff). In contrast, the present invention addresses an efficient way of changing the maximum data rate using the broadcast channel (e.g. Forward Access Channel (FACH) transmitted on the secondary common control physical channel (S-CCPCH)) and the use of the persistence parameter to compute the enhanced uplink rate in the autonomous mode.

In the autonomous mode the MS can transmit, without request, up to the power margin limit ($P_{margin\_limit\_auto}$). As before power margin is defined by $$P_{margin} = P_{eudch} = P_{max} - P_{dpcch}(1 + \beta_{dpdch} + \beta_{hs\text{-}dpcch}) \quad (1)$$

or in an alternative embodiment up to a maximum T/P ratio (EUDCH to Pilot ratio) where the $P_{margin\_limit\_auto}$ or $T/P_{max\_auto}$ is set by the BTS through layer one (L1) signaling. In the case of WCDMA the uplink pilot channel is carried on the DPCCH code channel. In this mode, the BTS provides the MS with an allowed TFC subset from which the MS's TFC selection algorithm selects a TFC to be used by employing the TFC selection method defined in 3GPP specifications. This TFC subset provided by the BTS is named the "UE allowed TFC subset".

The present invention addresses an efficient way of changing the $P_{margin\_limit\_auto}$ using the FACH transmitted on the secondary common control physical channel (S-CCPCH) when the MS is transmitting in the autonomous mode. Further, this invention also proposes to have the MS transmit in autonomous mode in predefined n consecutive sub-frames only (asynchronous nature of MS). The sub-frames in which MS is allowed to transmit in autonomous mode are assigned by the RNC. However, the signaling for the autonomous mode can be made at any point of time. This helps when the MS is in soft-handoff. The length of the autonomous mode time interval, in terms of n consecutive sub-frames, and the repetition rate of the autonomous mode time interval can be based on the number of users in autonomous mode, the number of users in explicit scheduling mode, or the number of user in autonomous and explicit scheduling mode. The buffer occupancy and rate of change in buffer occupancy of the users can also be considered in determining the autonomous mode time interval length and repetition rate of the time interval. For example, the autonomous mode time interval length could range from 2 to 10 frames (or sub-frames) and the repetition rate could be once every 30 frames (or sub-frames) and the range of the repetition rate could be from 2 to 100 frames (or sub-frames).

In practice, at the BTS, adjacent cells periodically provide updates of their current load to the scheduler or RNC. Note BTS and cell are used interchangeably in the following text. The scheduler or RNC transmits the above mentioned information to the BTS's periodically (e.g. 500 msec). The BTS computes a persistence value (p) based on the ROT at the source BTS and the ROT of the adjacent cells sent by the scheduler or RNC. The "persistence" is generally a non-negative integer and lies between 0 and 1. The BTS also computes $P_{margin\_limit\_auto}$ which based on the ROT information for the source cell and adjacent cells. The $(P_{margin\_limit\_auto})i$ from each cell i is computed for each MS and the minimum value is selected for broadcast transmission, i.e. $P_{margin\_limit\_auto} = \text{MIN}[(P_{margin\_limit\_auto})1, (P_{margin\_limit\_auto})2, \ldots]$. These two parameters are updated every frame. The persistence value and $P_{margin\_limit\_auto}$ are broadcast using FACH which is carried on the secondary common control physical channel (S-CCPCH) every frame. In an alternative embodiment the persistence value and the $P_{margin\_limit\_auto}$ can also be sent on the dedicated channel for each user.

Specifically, the BTS computes $P_{margin\_limit\_auto}$ by first receiving a power margin ($P_{margin}$) measurement that is sent periodically to the BTS by each UE (MS). $P_{margin}$ is defined as $P_{margin} = \text{Max\_UE\_Pwr} - P_{DPCCH}(1 + a_1 + a_2 + a_3)$ where $a_1 = \beta_{dpdch}/\beta_{dpcch}$, $a_2 = \beta_{hs\text{-}dpcch}/\beta_{dpcch}$ and $a_3 = \beta_{othercod\_mux\_ch}/\beta_{dpcch}$. Then $E_{c(DPCCH)}/N_t$ of the pilot bits for each MS is measured at BTS. The maximum SNR supported by each MS is then given by $$SNR_{max} = \frac{E_{c(dpcch)}}{N_t} \times \frac{P_{margin}}{P_{dpcch}} \times f\left(\sum_{i=1}^{n} TPC_i\right)$$

where $f(.)$ is a function of accumulated TPC bits in linear scale. The maximum $(E_b/I_0)_i$ for each $MS_i$ is then given by $$\left(\frac{E_b}{I_0}\right)_{i,max} = SNR_{max} \times PG$$

where PG is processing gain. Given there are $k_v$ voice users with data rates $R_v$ bits/sec, $k_{d1}$ data users having data rates of $R_{d1}$ bits/sec and $k_{d2}$ data users having data rates of $R_{d2}$ bits/sec, the total power received by the cell is given by $$I_0 W = \sum_{i=1}^{k_v(1+f)} v_i \cdot \varepsilon_{vi} \cdot E_{bv} \cdot R_v + \sum_{i=1}^{k_{d1}(1+f)} p \cdot \varepsilon_{d1i} \cdot E_{bd1} \cdot R_{d1} + \sum_{i=1}^{k_{d2}(1+f)} p \cdot \varepsilon_{d2i} \cdot E_{bd2} \cdot R_{d2} + N_0 W \quad (11)$$

where $f$ is the relative other cell interference times a scale factor dependent on rise information from other BTS's, v is the random variable representing voice activity for the voice and p is the persistence common to all autonomous data users (a deterministic value) and $\varepsilon_v$, $\varepsilon_{d1}$, and $\varepsilon_{d2}$ are log-normally distributed random variables which models the variations due to power control for the voice and autonomous data users. The value of the scale factor (in association with f) lies between 1 and 2. This scale factor is sent by RNC every t sec (e.g. t=500 msec). The outage probability (instantaneous noise rise at the base exceeding a set threshold) is upper bounded as per the following equation $$P_{out} \le Pr\left[Z = \left\{\left(\sum_{i=1}^{k_v(1+f)} v_i \cdot \varepsilon_{vi}\right) + \left(K_1 \sum_{i=1}^{k_{d1}(1+f)} \varepsilon_{d1i}\right) + \left(K_2 \sum_{i=1}^{k_{d2}(1+f)} \varepsilon_{d2i}\right)\right\}\right] \quad (12)$$

where $$K_0 = \frac{\frac{W}{R_v} \cdot (1-\eta)}{\frac{E_{bv}}{I_0}}, \quad K_1 = \frac{p \cdot E_{bd1} \cdot R_{d1}}{E_{bv} \cdot R_v}, \quad K_2 = \frac{p \cdot E_{bd2} \cdot R_{d2}}{E_{bv} \cdot R_v} \quad (13)$$

and $(1/\eta)$ is the threshold noise rise, e.g. $\eta=0.2$ results in a peak noise rise of 7 dB. The outage probability for voice calls for a predefined number of data calls can be derived based on the following equation if the random variable Z is normally distributed.

$$P_{out} = Q\left(\frac{K_0 - E(z)}{\sqrt{Var(z)}}\right) \quad (14)$$

where the mean and variances are given by $$E(z) = \left(\frac{\lambda_v}{\mu_v}\right) \cdot (1+f) \cdot \rho_v \cdot e^{\frac{(\beta \cdot \sigma_v)^2}{2}} + K_1 \cdot \left(\frac{\lambda_{d1}}{\mu_{d1}}\right) \cdot (1+f) \cdot p \cdot e^{\left(\frac{\beta \cdot \sigma_{d1}^2}{2}\right)} + K_2\left(\frac{\lambda_{d2}}{\mu_{d2}}\right) \cdot (1+f) \cdot p \cdot e^{\left(\frac{\beta \cdot \sigma_{d2}^2}{2}\right)}$$

$$Var(z) = \left(\frac{\lambda_v}{\mu_v}\right) \cdot (1+f) \cdot \rho_v \cdot e^{2(\beta \cdot \sigma_v)^2} + K_1 \cdot \left(\frac{\lambda_{d1}}{\mu_{d1}}\right) \cdot (1+f) \cdot p \cdot e^{2(\beta \cdot \sigma_{d1})^2} + K_2\left(\frac{\lambda_{d2}}{\mu_{d2}}\right) \cdot (1+f) \cdot p \cdot e^{2(\beta \cdot \sigma_{d2})^2}$$

where
$\lambda_v/\mu_v$=Voice Erlangs which is defined as the ratio of average voice arrival rate to average time per voice call.
$\lambda_{d1}/\mu_{d1}$=Data Erlangs which is defined as the ratio of average data arrival rate to average time per data call for a pool of users using data rate $R_{d1}$.
$\lambda_{d2}/\mu_{d2}$=Data Erlangs which is defined as the ratio of average data arrival rate to average time per data call for a pool of users using data rate $R_{d2}$.
$\rho_v$=Expected value of voice activity factor.
$\beta=\ln(10)/10$.
$\sigma_v$, $\sigma_{d1}$ and $\sigma_{d2}$=Power control standard deviation for voice and data respectively.

The aggregate $(E_b/I_0)_{agg}$, computed from equation (11-13) is then used (such that the noise rise and persistence p is satisfied) in conjunction with the instantaneous throughput vs. Eb/Io curves for each data rate (also known as static hull curves) and aggregate MS buffer size to determine the maximum data rate or $P_{margin\_limit\_auto}$ that can be supported by the MS's in autonomous mode as described further below.

The BTS can then compute persistence (p). Given the number of voice and data users and the allowable noise rise, the value of persistence can easily be computed from equation (14). Alternatively, given the persistence, allowable noise rise and number of voice users the number of autonomous data users that can be supported at a particular rate can also be calculated from equation (14).

In the MS, for the no soft handoff case, each MS decodes the S-CCPCH to find out the value of p and the $P_{margin\_limit\_auto}$ transmitted by BTS. The MS only decodes the FACH send on the S-CCPCH when it has data in its buffer. The MS transmits only in pre-defined sub-frames in the autonomous mode. The sub-frames in which a MS is allowed to transmit in autonomous mode is set up by the scheduler or RNC. Each MS desiring to transmit, transmits the data at a rate proportional to $P_{margin\_limit\_auto}$ with a probability p at the pre-allocated sub-frames. If the MS fails to transmit (with a probability (1−p)), it waits a random amount of time (exponential backoff with backoff timer dependent on the MS state) and transmits the data with the new $P_{margin\_limit\_auto}$ and new persistence probability at the pre-allocated sub-frames.

In the soft handoff case, each MS decodes the FACH sent on the S-CCPCH from all the Active Set BTS's for every active frame and stores the persistence $p_i$ and the $(P_{margin\_limit\_auto})_i$ transmitted by each Active Set BTS i. The MS then determines p and $P_{margin\_limit\_auto}$ by computing $p=MIN(p_1, p_2, \ldots)$ and $P_{margin\_limit\_auto}=MIN[(P_{margin\_limit\_auto})_1, (P_{margin\_limit\_auto})_2, \ldots)$ where the numerical subscript denotes a particular Active Set BTS. The MS transmits only in pre-defined sub-frames in the autonomous mode. The sub-frames in which a MS is allowed to transmit in autonomous mode are set up by the scheduler or RNC. Each MS desiring to transmit, transmits the data at a rate proportional to $P_{margin\_limit\_auto}$ with a probability p at the pre-allocated sub-frames. If the MS fails to transmit (with a probability (1−p)), it waits a random amount of time (exponential backoff with backoff timer dependent on the MS state) and transmits the data with the new $P_{margin\_limit\_auto}$ and new persistence probability at the pre-allocated sub-frames.

In this embodiment, the present invention addresses an efficient way of changing the $P_{margin\_limit\_auto}$ ratio using the broadcast channel when the MS is transmitting in the autonomous mode. This avoids performance degradation of the dedicated channel and also defining a new frame format to support enhanced uplink channel if $P_{margin\_limit\_auto}$ was transmitted using a dedicated channel. Using the persistence value (p) transmitted on the broadcast channel, the MS can control the reverse link interference. The present invention also describes having the MS transmit in autonomous mode in predefined n consecutive sub-frames only (asynchronous nature of MS). The sub-frames in which MS is allowed to transmit in autonomous mode are assigned by the RNC.

The RNC needs to signal the TFCS subset to be used by the MS through RRC signaling to individual MSs, in order to minimize the MS's data transmission from significantly degrading the performance of voice users in the system. Through the techniques detailed in the present invention, this is accomplished through more efficient signaling using a broadcast to all users. Even if the dedicated control channel is used to convey the information the signaling is more efficient on the RNC-to-BTS (or RNC-to-Node B) interface due to it being sent to a BTS to be used for all users in that BTS.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for rate selection by a communication device for uplink during soft handoff in a communication system, the method comprising steps of:
    receiving a scheduling assignment message including a power margin limit from a scheduler;
    determining a data rate for an uplink transmission during soft handoff using the power margin limit, local channel conditions and a buffer occupancy of the communication device; and
    transmitting to a serving base station on an uplink channel at the data rate determined from the determining step;
    wherein the determining step includes a data rate constraint of $$K2*P_{margin\_limit}/P_{dpcch}*TPC\_correction$$

where $P_{margin\_limit}$ is the power margin limit, $P_{dpcch}$ is a power of the downlink physical control channel, and K2 is a scale factor, and TPC_correction dependent upon a power control command history and pilot channel signal strength.

2. A method for rate selection by a communication device for uplink during soft handoff in a communication system, the method comprising steps of:
    receiving a scheduling assignment message including a power margin limit from a scheduler;
    determining a data rate for an uplink transmission during soft handoff using the power margin limit, local channel conditions and a buffer occupancy of the communication device; and
    transmitting to a serving base station on an uplink channel at the data rate determined from the determining step;
    wherein the determining step includes a data rate constraint of $$R_{max\_effective\_SHOtarget}*g(imbalance)$$

where $R_{max\_effective\_SHOtarget}$ is the maximum effective rate, and g(imbalance) is an imbalance between a transmission gain of the scheduling cell and communication device, divided by a transmission gain between an adjacent cell with next largest or largest transmission gain relative to scheduling cell and the communication device.

* * * * *